(12) United States Patent
Chee

(10) Patent No.: US 6,671,107 B2
(45) Date of Patent: Dec. 30, 2003

(54) MOUNTING OF PRE-SCAN OPTICS FOR A LASER SCANNING DEVICE

(75) Inventor: Christopher Gregory Chee, Lexington, KY (US)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 10/124,962

(22) Filed: Apr. 18, 2002

(65) Prior Publication Data

US 2003/0197959 A1 Oct. 23, 2003

(51) Int. Cl.[7] .................................................. G02B 7/02
(52) U.S. Cl. ...................... 359/819; 359/821; 359/822; 359/811
(58) Field of Search ................................. 359/819, 822, 359/821, 811

(56) References Cited

U.S. PATENT DOCUMENTS

| | | | |
|---|---|---|---|
| 4,403,235 A | 9/1983 | Fedder et al. ............... 347/259 |
| 4,563,056 A | 1/1986 | Tagawa et al. ............. 359/218 |
| 4,601,452 A | 7/1986 | Rando ..................... 248/187.1 |
| 4,817,789 A * | 4/1989 | Paul ........................... 206/5.1 |
| 4,868,673 A | 9/1989 | Negoro ....................... 358/296 |
| 5,048,050 A | 9/1991 | Komurasaki ................ 312/101 |
| 5,057,863 A | 10/1991 | Yasuda ......................... 355/57 |
| 5,111,340 A | 5/1992 | Kashima et al. ............ 359/819 |
| 5,136,416 A | 8/1992 | Shiraishi .................... 359/217 |
| 5,155,783 A | 10/1992 | Suwashita .................... 385/88 |
| 5,255,115 A | 10/1993 | Kikuchi ...................... 359/209 |
| 5,257,138 A | 10/1993 | Yamaguchi et al. ......... 359/819 |
| 5,280,553 A | 1/1994 | Suwashita .................... 385/88 |
| 5,331,343 A | 7/1994 | Ono et al. ................... 347/257 |
| 5,506,719 A | 4/1996 | Murakami et al. .......... 359/216 |
| 5,625,482 A * | 4/1997 | Sugiura ...................... 359/216 |
| 5,671,077 A | 9/1997 | Imakawa et al. ........... 359/204 |
| 5,793,408 A | 8/1998 | Nakajima ................... 347/259 |
| 5,936,756 A | 8/1999 | Nalahuma ................... 359/208 |
| 5,943,153 A | 8/1999 | Nauju et al. ................ 359/210 |
| 5,946,023 A | 8/1999 | Blanding .................... 347/257 |
| 5,953,040 A | 9/1999 | Barton et al. ............... 347/241 |
| 5,966,231 A * | 10/1999 | Bush et al. .................. 359/204 |
| 6,005,703 A * | 12/1999 | Maddox et al. ............. 359/206 |
| 6,064,504 A | 5/2000 | Minakuchi et al. ......... 359/210 |
| 6,091,534 A | 7/2000 | Nakajima ................... 359/208 |
| 6,097,575 A * | 8/2000 | Trang et al. ................ 369/300 |
| 6,133,566 A | 10/2000 | Yamaguchi ................. 250/234 |
| 6,169,623 B1 | 1/2001 | Au Yeung et al. .......... 359/212 |

\* cited by examiner

*Primary Examiner*—Ricky Mack
*Assistant Examiner*—Brandi Thomas
(74) *Attorney, Agent, or Firm*—Taylor & Aust, P.C.; John A. Brady

(57) ABSTRACT

A pre-scan optics assembly for a laser scanning device. A housing includes reference surfaces against which a pre-scan lens is directly referenced, to restrain the lens against rotation about the optical axis and the scan axis of the device. A lens carrier is attached to the housing and has an abutment surface to restrain the lens against rotation about the process axis of the device. A spring clip secures position of all components in the desired locations. The optical system aperture is formed directly in a wall of the lens carrier.

24 Claims, 3 Drawing Sheets

MOUNTING OF PRE-SCAN OPTICS FOR A LASER SCANNING DEVICE

BACKGROUND OF THE INVENTION

1. Field of the Invention

The present invention relates to optical systems of laser scanning devices, such as laser printers, and, more particularly, to the pre-scan optics assemblies in such devices.

2. Description of the Related Art

Optical systems used in laser printers, and other laser scanning devices, may be characterized as having three sub-systems, namely, a pre-scan optical sub-system, a scanning sub-system, and a post-scan sub-system, each with appropriate mounting hardware for properly positioning the components thereof. A known pre-scan optical sub-system includes a laser diode with large beam divergence serving as a light source, a collimator lens, a pre-scan lens and a plane pre-scan mirror. The collimator lens produces a collimated beam from the light emitted by the laser diode. The pre-scan lens focuses the processed beam to a waist, and the plane pre-scan mirror folds the pre-scan optics path, and attenuates laser power.

The scanning sub-system is essentially a motor driven, rotatable, polygonal reflector, having adjacent peripheral mirror surfaces, or facets, that both translate and rotate during operation of the printer. The mirror surfaces reflect the collimated and focused beam from the pre-scan optical sub-system. The translation direction of the reflector determines the scan direction of the beam passing to a scanned object, such as a photosensitive drum in a laser printer.

A known post-scan optical system includes a focusing lens for transforming the light beam reflected from the polygonal reflector of the scanning sub-system into a beam having spot size suitable for the laser printing operation, and a lens known in the art as an f-theta lens. The post-scan optical sub-system may also include one or more folding mirrors to adapt to the geometry of the printer apparatus.

The pre-scan optical sub-system defines the light beam axis between the laser diode source and the rotatable polygonal reflector, and establishes the beam diameters and curvature on that axis. Although the common optical components used in known pre-scan sub-systems are relatively uncomplicated from a design standpoint, the pre-scan optical sub-system utilizes very short focal length optics of high numeric aperture for reasons of size and efficiency of coupling to the laser diode. As a result, pre-scan optics assemblies are highly sensitive to component tolerance and to placement accuracy. Also, the pre-scan optical sub-system is required to produce a beam waist in the cross scan or processing direction, perpendicular to the scan direction, at a precise location relative to the polygonal reflector. This requirement has been satisfied in the prior art by a plano-cylindrical lens oriented with the axis of the cylinder parallel to the scan direction. The use of aperture stops for reducing the width of the beam in the pre-scan optics assembly is known.

The pre-scan optics assembly of the pre-scan optical subsystem can be considered to include the aperture, the lens, the lens carrier and mounting hardware. Proper alignment of these components is critical to the overall performance of the device. To achieve alignment accuracy, it is known to establish tight tolerances for manufacture and assembly of many components, and/or sub-assembling some or all of the components in fixtures to obtain proper alignment before assembling the components into the printing device. These prior approaches are complex, subject to error and are costly to perform, adding significantly to the overall cost of the printing device.

What is needed in the art is a pre-scan optics design that simplifies assembly, reduces the number of parts requiring tight manufacturing or assembly tolerances, and eliminates the need for costly subassemblies.

SUMMARY OF THE INVENTION

The present invention provides accurate alignment of the pre-scan optics for a laser scanning unit by directly referencing datum surfaces of the component parts to mating surfaces in the system base housing. Errors in alignment are minimized by maximizing the dimensions of the mating surfaces, and by reducing the number of parts that make-up the pre-scan optics assembly.

The invention comprises, in one form thereof, a pre-scan optics assembly for a laser scanning device, with a housing adapted to be secured to the device, a channel defined in the housing, and first and second spaced reference surfaces in the housing. A lens carrier is securable to the housing, and has a pocket. A pre-scan lens is adapted to be held in the pocket of the lens carrier, and has a datum surface referenced against the first and second reference surfaces in the housing.

The invention comprises, in another form thereof, a method for assembling a pre-scan optics assembly in a laser scanning device. The method comprises steps of providing a housing, spaced reference surfaces in the housing, and a channel in the housing, the channel having spaced tracks; providing a lens and a lens carrier, the lens carrier having a forward abutment surface; restraining the lens in the lens carrier; urging the lens forwardly in the lens carrier, against the abutment surface; securing the lens carrier in the channel; and urging the lens downwardly against the reference surfaces.

The invention comprises, in still another form thereof, a lens carrier for a pre-scan optics assembly having a housing for receiving the carrier in a laser scanning device. The lens carrier has a body defining a pocket for receiving and restraining a lens therein. Portions of the body are received by and referenced to the housing. The body includes a wall defining an optical aperture of the assembly.

The invention comprises, in a further form thereof a pre-scan optics assembly for a laser scanning device having an optical axis, a scan axis and a process axis, the pre-scan optics assembly having a lens with a primary datum surface and a face surface. A housing has a reference surface for restraining the lens against rotation about the optical axis and the scan axis of the device. A lens carrier has an abutment surface for restraining the lens against rotation about the process axis. The lens carrier is secured in the housing for fixing the position of the lens carrier and the lens.

An advantage of the present invention is providing a simplified pre-scan optics assembly for laser scanning devices that is easier to manufacture and less costly to assemble than previous designs are.

Another advantage is providing fewer parts in a pre-scan optics assembly, and reducing the individual tolerance requirements for individual parts, while maintaining a specified overall assembly tolerance.

Yet another advantage is reducing the need for pre-assembly fixturing of components in a pre-scan optics assembly.

Still another advantage is securing a pre-scan lens of a pre-scan optics assembly against rotation about the optical axis, the process axis and the scan axis of a laser scanning device.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
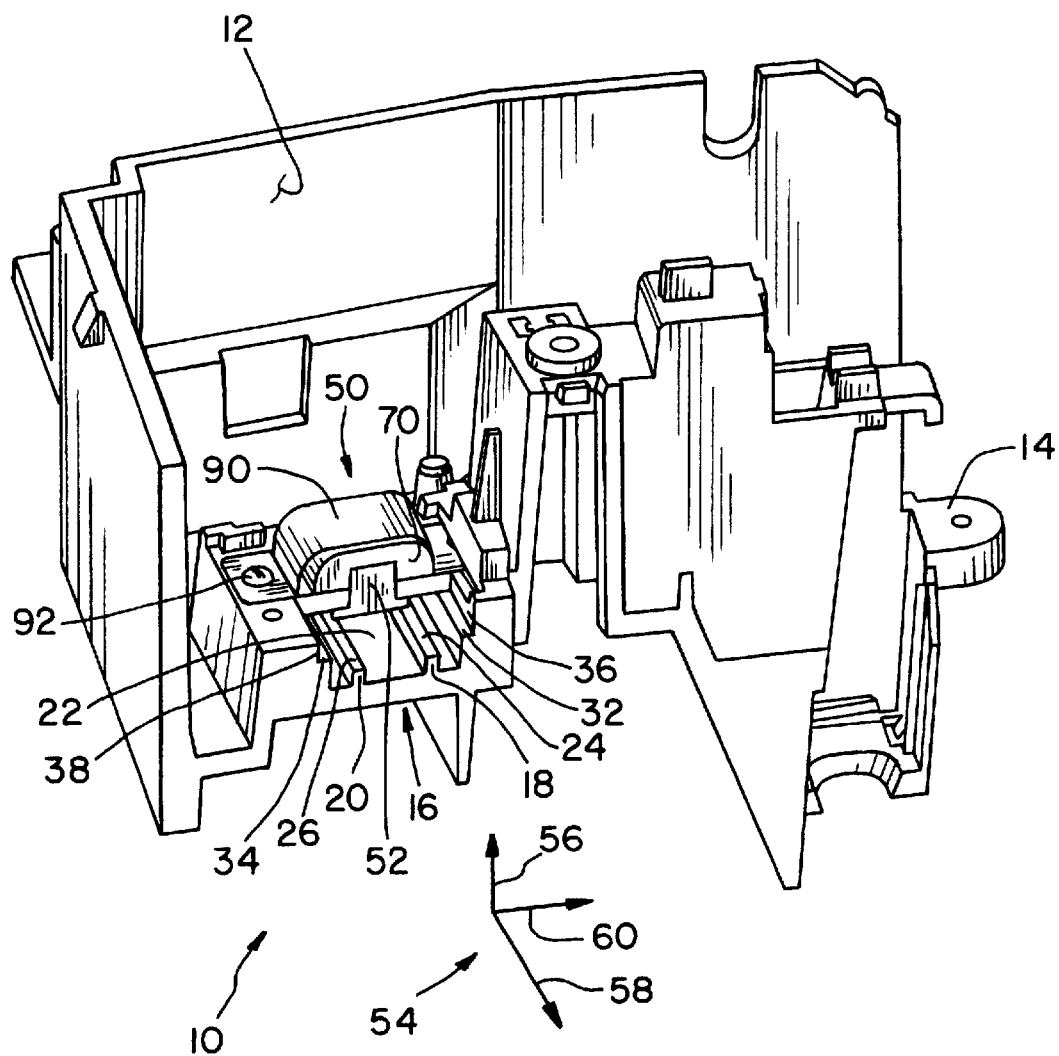
FIG. 1 is a perspective view of a pre-scan optics system in accordance with the present invention.

Referring now to the drawings, and particularly to FIG. 1, there is shown a pre-scan optical assembly 10 in accordance with the present invention. Optical assembly 10 is suitable for a laser scanning device, such as a laser printer or the like.

Pre-scan optical assembly 10 is part of a pre-scan subsystem including a housing 12 which is an integral body mountable in the particular laser scanning device in which pre-scan optical assembly 10 will be used. Housing 12 may be a plastic cast body and includes tabs 14 and other fixtures or formations not relevant to the present invention, which will not be described in further detail herein.

Of importance to the present invention, housing 12 includes a channel 16 for holding the pre-scan optics to be described subsequently herein. Channel 16 is an integral formation of housing 12, cast or otherwise formed as part of the integral body of housing 12. Channel 16 includes first and second spaced protrusions 18 and 20, respectively, which are in the nature of raised bodies extending upwardly from a floor 22 of channel 16. At the top of each protrusion 18 and 20 is a reference surface 24 and 26, respectively.

Outwardly of each protrusion 18 and 20 in channel 16 are first and second tracks 28 and 30, respectively. Tracks 28 and 30 are at a higher elevation from floor 22 than are reference surfaces 24 and 26 of protrusions 18 and 20. Each first and second tracks 28 and 30 includes a substantially horizontal base 32 and 34, respectively, and a substantially vertical side 36 and 38, respectively. Sides 36 and 38 are disposed outwardly of tracks 28 and 30, respectively, with reference to protrusions 18 and 20, which are located centrally between tracks 28 and 30.

Channel 16 is sized and arranged to securably retain therein a pre-scan lens assembly 50. Together with features of pre-scan lens assembly 50 to be described subsequently herein, channel 16 secures a pre-scan lens 52 against rotation about the process axis, optical axis and scan axis of the laser scanning device. For reference purposes in understanding the present invention, each of FIGS. 1–3 includes a guide 54 having arrows 56, 58 and 60, indicating the process axis, optical axis and scan axis respectively, for the laser scanning device in which pre-scan optical assembly 10 is used. It should be understood that guide 54 is not an element in the invention, but provided merely for orientation and explanation purposes, to better understand the present invention. As those skilled in the art will readily understand, it is necessary that pre-scan lens 52 be restrained against rotation about any of process axis 56, optical axis 58 or scan axis 60.

Pre-scan lens 52 has a primary datum surface 62 on the bottom thereof, which is provided and used for orientation and reference of pre-scan lens 52. Also included for referencing and orientation of pre-scan lens 52 is a face surface 64.

Figure 2:
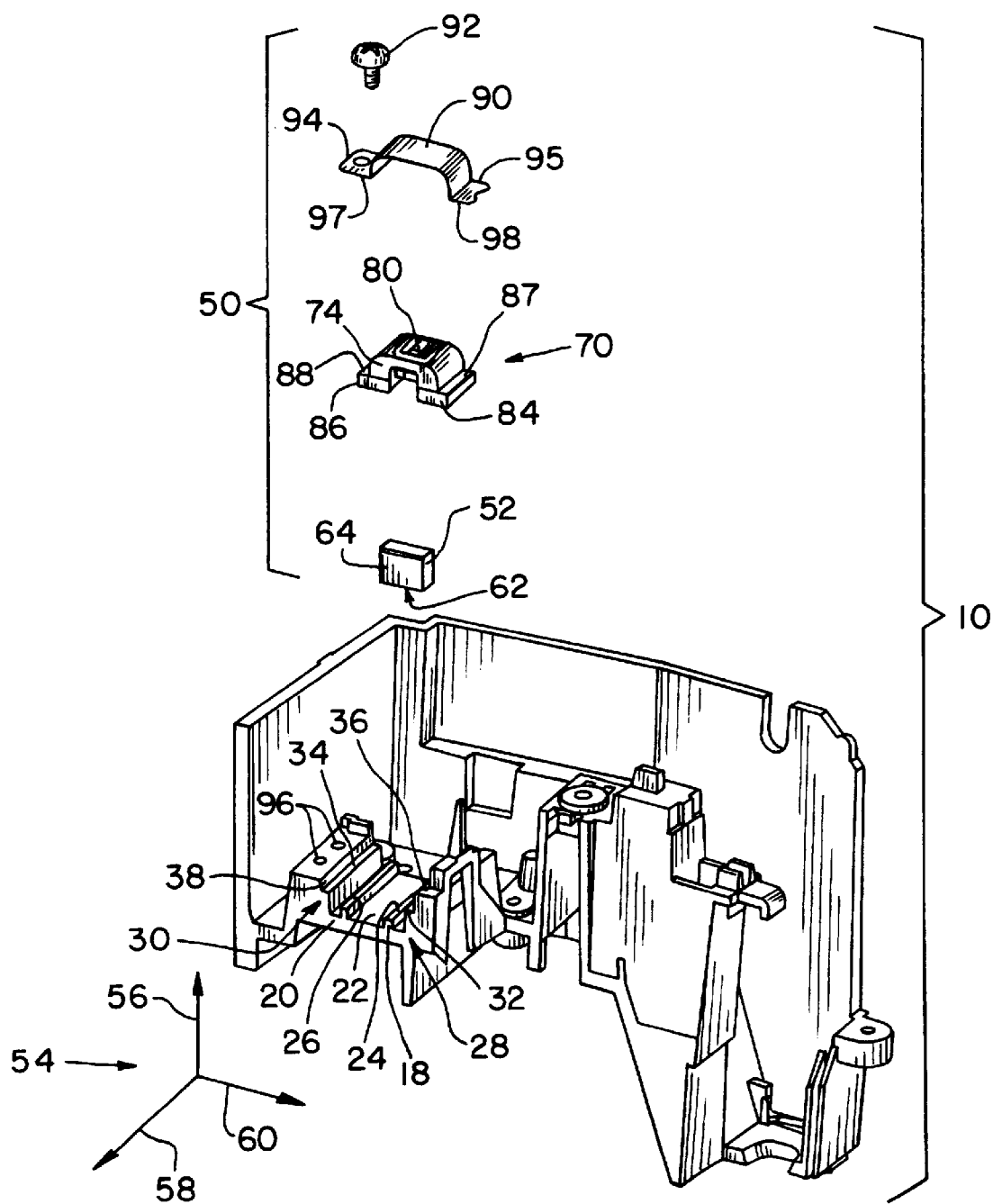
FIG. 2 is an exploded, perspective view of the pre-scan optics system shown in FIG. 1.
Figure 3:
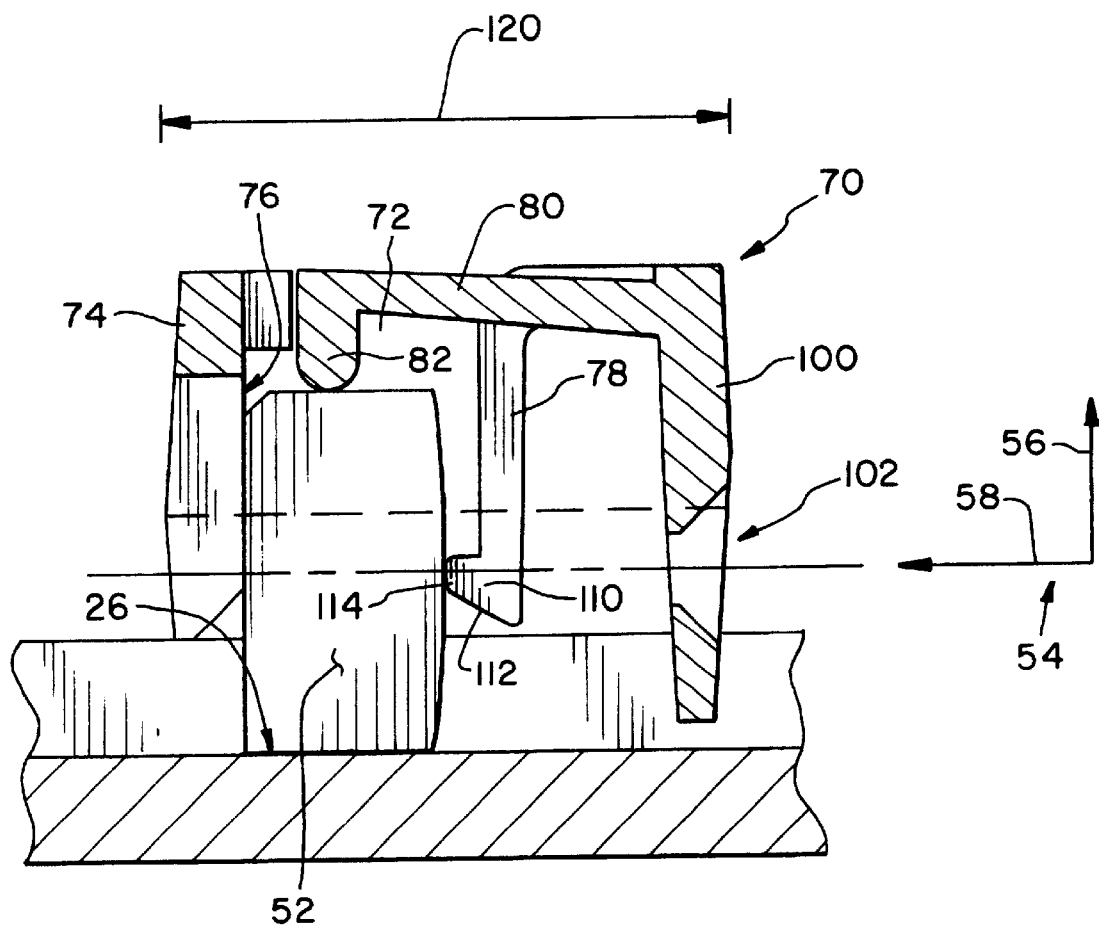
FIG. 3 is cross-sectional view of the assembled lens carrier shown in FIG. 1

Pre-scan lens 52 is restrained within a lens carrier 70. Lens carrier 70 is a substantially frame-like structure engaging peripheral edges of lens 52 while having a substantially open central portion through which a beam may pass. Lens carrier 70 defines a pocket 72 for receiving pre-scan lens 52 and retaining pre-scan lens 52 therein. As best seen in FIG. 3, pocket 72 is defined by a wall 74 having an abutment surface 76 against which face 64 of lens 52 is restrained. A biasing leg or legs 78, which are compliant members of lens carrier 70, urge pre-scan lens 52 against abutment surface 76 of wall 74. Two such biasing legs 78 are preferred, spaced from each other, one near each lateral edge of lens 52. At a top 80 of lens carrier 70, a biasing arm 82 urges pre-scan lens 52 downwardly. As shown in FIG. 3, lens carrier 70 is of insufficient vertical dimension to receive the entire installed height of pre-scan lens 52, but instead receives only a top portion thereof, with the lower portion of lens 52 extending below lens carrier 70. As seen in FIG. 2, lens carrier 70 extends outwardly of lens 52, having wings 84 and 86 to be received in tracks 28 and 30 of channel 16, in a manner to be described subsequently herein. Wings 84 and 86 have top surfaces 87 and 88, respectively.

To secure lens carrier 70 in proper position in channel 16, a spring clip 90 is provided. A screw, bolt, rivet or other suitable fastener 92 is provided for engaging both a laterally extending flange 94 of spring clip 90 and portion of housing 12. A similar flange 95 is provided on an end of clip 90 of opposite flange 94. If fastener 92 is provided as a screw, bolt or other threaded fastener, one or more threaded holes 96 may be provided in housing 12 for threadedly receiving fastener 92. Flanges 94 and 95 have bottom surfaces 97 and 98, respectively.

An additional feature of the present invention is that the optical system aperture of pre-scan optical assembly 10 is integrally formed with lens carrier 70. An aperture wall 100 is provided extending downwardly from top 80 at a desired spaced distance from pocket 72 and pre-scan lens 52 restrained therein. An elliptical aperture 102 is formed in aperture wall 100.

During assembly of pre-scan optical assembly 10, pre-scan lens 52 is inserted in pocket 72 of lens carrier 70. Resilient biasing leg 78 yields sufficiently to lens 52 to allow the insertion of lens 52 into pocket 72. However lens 52 is biased forwardly by biasing leg or legs 78 against abutment surface 76 of wall 74. To facilitate the insertion of lens 52 into pocket 72, biasing legs 78 may include foot portions 110 at the bottom thereof, having angular surfaces 112 angling upwardly and inwardly toward pocket 72, terminating at a toe 114 for engaging the surface of lens 52. Thus, as lens 52 is inserted into pocket 72, biasing legs 78 can be deflected by lens 52, as lens 52 slides along angular surface 112 into pocket 72, with legs 78 remaining in place, with toe 114 against lens 52 as lens 52 reaches pocket 72.

With lens 52 fully inserted into pocket 72, lens carrier 70 is placed in channel 16. Wings 84 and 86 of lens carrier 70 rest on base 32 and base 34 of tracks 28 and 30, respectively, just inwardly of sides 36 and 38, with minimal clearance therebetween. Thus, lens carrier 70 fits snuggly in tracks 28 and 30. Primary datum surface 62 of lens 52 is forced downwardly on reference surfaces 24 and 26 of protrusions 18 and 20. One or more biasing arms 82, pushing downwardly on lens 52 ensures contact between primary datum surface 62 and reference surfaces 24 and 26.

Rotational alignment of pre-scan lens 52 is achieved by directly referencing primary datum surface 62 against the reference surfaces 24 and 26 in housing 12. As stated, reference surfaces 24 and 26 are spaced some distance apart. Rotational error in alignment of lens 52 about optical axis 58 for a given tolerance condition decreases as the distance between reference surfaces 24 and 26 increases. However, since pre-scan lens 52 must be sufficiently long to span the distance between reference surfaces 24 and 26, which after a certain nominal length may add significantly to the cost of pre-scan lens 52, the cost for a lens of sufficient length may be a limiting factor in the degree to which the error in rotational alignment can be decreased by increasing the spacing between reference surfaces 24 and 26.

Rotational alignment of pre-scan lens 52 about scan axis 60 is also restrained by primary datum surface 62 resting on reference surfaces 24 and 26. The rotational error in alignment about scan axis 60, for a given tolerance condition, decreases as the thickness of pre-scan lens 52, and specifically the thickness dimension of primary datum surface 62, increases. A primary factor in determining the acceptable thickness of lens 52 may be the affect on beam conditioning for a laser beam passing through pre-scan lens 52.

Thus, for given tolerance conditions, the rotational error in alignment about the optical axis can be decreased by increasing the length of lens 52 between reference surfaces 24 and 26, and the rotational error in alignment about the scan axis can be decreased by increasing the thickness of pre-scan lens 52. Alignment of lens 52 with respect to optical axis 58 and scan axis 60 is achieved by referencing primary datum surface 62 directly against reference surfaces 24 and 26 provided in housing 12, without the need for intervening fixtures, subassemblies or other complicated structures.

As best seen in FIG. 3, rotational alignment about process axis 56 is achieved by referencing pre-scan lens 52 to abutment surface 76 of lens carrier 70 and properly assembling lens carrier 70 into channel 16. Accuracy in rotational alignment is achieved by minimizing the clearance between lens carrier 70 and channel 16 and by maximizing a length 120 of lens carrier 70. Lens 52 is biased against abutment surface 76 by biasing legs 78, with two or more such biasing legs separated from each other along the scan axis. Simultaneously, with lens carrier 70 properly seated in channel 16, biasing arm 82 urges lens 52 downwardly against reference surfaces 24 and 26. The biasing force of biasing arm 82 against lens 52 ensures that primary datum surface 62 is restrained flush against reference surface 24 and 26 in both the width and length of lens 52.

To achieve the appropriate biasing forces, and secure all components in their proper referenced positions, spring clip 90 engages lens carrier 70 and is securely fastened to housing 12 by fasteners 92 engaged in holes 96 of housing 12. One or more fasteners 92 may be used in one or more holes 96. In its working position, spring clip 90 exerts force through bottom surfaces 97 and 98 of flanges 94 and 95 against top surfaces 87 and 88 of wings 84 and 86 of lens carrier 70, pushing wings 84 and 86 against bases 32 and 34 of tracks 28 and 30. The combination of frictional force developed between the engaged surfaces and the force exerted by spring clip 90 restrains lens carrier 70 from any movement. With lens 52 securely restrained in pocket 72, lens 52 is also then securely restrained in the desired position.

Providing aperture 102 as an integral part of aperture wall 100 of lens carrier 70 reduces the total part count of the pre-scan optics assembly, and thereby reduces the overall tolerance stack-up resulting from the number of parts in an assembly. Thus, for a given assembly tolerance, with reduced part count, the individual tolerance of each part is increased.

The present invention provides a structure for accurately aligning the pre-scan optics without the need for costly subassemblies, and reduces the total number of tight tolerances required to achieve the overall system tolerance. Accurate alignment of the pre-scan optics is achieved by directly referencing datum surfaces of the pre-scan lens to mating surfaces in the unit base housing. Within acceptable process impacts and cost considerations, alignment errors are minimized by maximizing distances between mating reference surfaces and reducing the overall part count of the assembly. Pre-assembly in fixtures is eliminated, and manufacturing and assembly costs are decreased.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims

What is claimed is:

1. A pre-scan optics assembly for a laser scanning device, comprising:
   a housing adapted to be secured in the device;
   a channel defined in said housing;
   first and second spaced reference surfaces in said channel;
   first and second spaced tracks, each having a side and a base;
   a lens carrier securable to said housing, said lens carrier being adapted to be received in said tracks, and said lens carrier having a pocket;
   a pre-scan lens adapted to be held in said pocket of said lens carrier, and having a datum surface referenced against said first and second reference surfaces in said housing.

2. The pre-scan optics assembly of claim 1, said first and second reference surfaces disposed between said tracks.

3. The pre-scan optics assembly of claim 2, said lens carrier including biasing means against said lens, for restraining said lens in said pocket.

4. The pre-scan optics assembly of claim 3, said lens carrier having an abutment surface, and said lens having a face surface referenced against said abutment surface.

5. The pre-scan optics assembly of claim 4, said biasing means including a biasing leg urging said lens toward said abutment surface and a biasing arm urging said lens against said first and second reference surfaces.

6. The pre-scan optics assembly of claim 5, said lens carrier including a wall having an optical system aperture therein.

7. The pre-scan optics assembly of claim 6, including a spring clip engaging said lens carrier, and a fastener engaging said spring clip and said housing.

8. The pre-scan optics assembly of claim 1, including a spring clip engaging said lens carrier, and a fastener engaging said spring clip and said housing.

9. The pre-scan optics assembly of claim 1, said lens carrier including biasing means against said lens, for restraining said lens in said pocket.

10. The pre-scan optics assembly of claim 9, said lens carrier including a wall having an optical system aperture therein.

11. The pre-scan optics assembly of claim 1, said lens carrier including a wall having an optical system aperture therein.

12. The pre-scan optics assembly of claim 1, said lens carrier including an abutment surface, a biasing leg engaged against said lens and urging said lens against said abutment surface, and a biasing arm urging said lens against said first and second reference surfaces.

13. A method for assembling a pre-scan optics assembly in a laser scanning device, said method comprising steps of:
   providing a housing, and a channel in the housing, the channel having spaced reference surfaces and spaced tracks therein;
   providing a lens and a lens carrier, the lens carrier having a forward abutment surface and being configured for holding the lens therein;
   restraining the lens in the lens carrier;
   urging the lens forwardly in the lens carrier, against the abutment surface;
   securing the lens carrier in the tracks of the channel; and
   urging the lens downwardly against the reference surfaces in the channel.

14. A lens carrier for a pre-scan optics assembly in a laser scanning device having a housing for receiving said lens carrier, said lens carrier comprising:
   a carrier body defining a pocket for receiving and restraining a lens therein;
   portions of said body received by and referenced to the housing; and
   said body including a wall defining an optical aperture of the assembly.

15. The lens carrier of claim 14, including a biasing leg for urging a lens forwardly in said pocket, and a biasing arm for urging a lens downwardly in said pocket.

16. A pre-scan optics assembly for a laser scanning device having an optical axis, a scan axis and a process axis, said pre-scan optics assembly comprising:
   a lens having a primary datum surface and a face surface;
   a housing having a reference surface adapted and arranged for engaging said primary datum surface of said lens, and fixing a position of said lens with respect to rotation about the optical axis and the scan axis of the device;
   a lens carrier having an abutment surface adapted and arranged for engaging said face surface of said lens, and restraining said lens against rotation about the process axis; and
   means for securing said lens carrier in said housing for fixing the position of said lens carrier and said lens.

17. The pre-scan optics assembly of claim 16, including an optical system aperture formed in said lens carrier.

18. The pre-scan optics assembly of claim 17, including a channel in said housing for receiving said lens carrier.

19. The pre-scan optics assembly of claim 18, said lens carrier having outwardly extending wings received in said channel.

20. The pre-scan optics assembly of claim 19, including a hold down clip for securing said lens carrier in said channel.

21. The pre-scan optics assembly of claim 16, said lens carrier including a biasing leg for urging said lens face surface against said abutment surface, and a biasing arm for urging said lens primary datum surface against said reference surface.

22. The pre-scan optics assembly of claim 21, said housing defining a channel therein, said channel having first and second tracks at the outer edges thereof, each said track having a base and a side, and said lens carrier having first and second wings received in said tracks, said first and second wings resting on said bases and restrained by said sides.

23. The pre-scan optics assembly of claim 22, said housing having two reference surfaces disposed between said tracks, each said reference surface adapted and arranged for engaging said primary datum surface of said lens.

24. The pre-scan optics assembly of claim 23, said primary datum surface extending below said first and second wings, and said reference surfaces disposed below said tracks.

* * * * *